Patented Apr. 14, 1925.

1,533,594

UNITED STATES PATENT OFFICE.

FRANZ HASSLER, OF VOLKSDORF, NEAR HAMBURG, GERMANY.

TANNING AGENT.

No Drawing.   Application filed September 1, 1921.   Serial No. 497,727.

*To all whom it may concern:*

Be it known that I, FRANZ HASSLER, a citizen of Hamburg, Germany, residing at Volksdorf, near Hamburg, Germany, have invented certain new and useful Improvements in Tanning Agents (for which I have filed application for patent in Germany on August 21, 1918), of which the following is a specification.

I have found that, on heating the aromatic hydrocarbons with sulphur and sulphuric acid, new condensation products were obtained, which proved to be valuable artificial tanning materials. Instead of the hydrocarbons it is possible to heat their sulpho-acids with sulphur, adding, if necessary, more sulphuric acid. The proportions of the materials and the temperatures can be varied to a fairly great extent. Instead of sulphur, sulphides, such as pyrites, may be used.

The process is virtually the same whether sulfonic acid compounds are employed, or sulfuric acid and aromatic hydrocarbon, since in the latter case these two bodies react with each other to form the aromatic sulfonic acid. Similarly it is the same process whether free sulfur or sulfur as sulfids is employed, since in the latter case the sulfur of the sulfid reacts.

According to the conditions under which the work is done products are obtained which are easily soluble, soluble only with difficulty, or even insoluble in water. The soluble products give heavy precipitates with gelatine and may be used at once for tanning purposes.

On being treated with alkali the products undergo a change indicated by an alteration from the original very dark color to a considerably lighter one and, in the case of products obtained from naphthalene, an alteration from bluish-black to yellowish brown. The light color does not disappear on being subsequently acidified. Insoluble materials formed in the process, and those that are soluble only with difficulty, become more soluble on being boiled with alkali.

For tanning, the easily soluble products can be used as they are, preferably after treating them with alkali and then slightly acidifying them. Contrary to most artificial tanning substances, not only the free acid, but also the salt will tan. The sodium salts can be used, or the calcium and magnesium salts may be used.

For a like reason, the products produced in the present process differ from the artificial tanning agents of the nature of sulfonic acid compounds and phenolic condensation products, in this respect, that while leather tanned with natural tanning agents, and leather tanned with the hitherto known artificial tanning agents, can always be detanned by treatment with soda solution, the leather tanned by the present process cannot be so detanned even with soda solutions of the same strength, or indeed somewhat greater strength, despite the fact that the original tanning material is very soluble in dilute alkali solutions. The compound of the hide with this artificial tanning agent is stable, even in dilute alkali solution. It is probably for this reason that the alkaline solution can be used to tan hide.

To the slightly soluble products, after treatment thereof with alkali, the easily soluble products or other well-known tanning substances can be added if desired, and in this way the former are kept soluble and will penetrate more easily into the hide.

The easily soluble products make the slightly soluble natural tanning substances easily soluble and therefore offer a special advantage when used together with them.

*I. Examples for the production of condensation products.*

1. 80 parts of naphthalene, 200 parts of concentrated sulphuric acid and 24 parts of sulphur are heated to about 160 to 180° C., being stirred all the time. The fusion assumes a bluish violet color, turning afterwards to greenish black. The time required for the reaction is 6 hours. The mass is dissolved in water. One part precipitates, but is easily soluble in water after washing out. On adding alkali the dark brown color turns to yellowish brown; the light color continues on acidifying; the acidified solution gives a heavy precipitate with gelatine.

If more sulphur and less sulphuric acid are used, a highly colloidal solution is at first obtained, and afterwards an absolutely insoluble resinous substance.

2. 100 parts of naphthalene sulphonic acid ($C_{10}H_7SO_3H$) (obtained by heating 50 parts of naphthalene to 170° C. with 60 parts of sulphuric acid) and 12 parts of sulphur are heated up to about 150° C. for about 20 hours. The products of this reaction is bluish black and easily soluble in water; neutralized with alkali it turns yellow. Instead of alkaline, an alkali earth such as magnesia or lime may be used.

3. 100 parts of benzene sulphonic acid, 20 parts of sulphur, 300 parts of sulphuric acid are heated to about 200° C. for about 12 hours. The mass is then mixed with water. The product of reaction is liberated and, when cold, is almost insoluble in water. It is dissolved by boiling with sodium hydrate. During this process the reddish brown color is changed to light yellow. As the product precipitates on acidifying, the product made according to Example 2, or one of the well-known artificial tanning substances is added to keep it in solution.

Other hydrocarbons, such as anthracene, crude anthracene and their sulphonic acids are treated in a manner similar to Examples 1 and 2.

*II. Examples for the use of the condensation products as tanning substances.*

1. The product obtained by Example I.2 is neutralized with soda, boiled, slightly acidified and the skin, from which the hair has been removed, placed first in a 5% solution of the acidified material, then into successively stronger solutions thereof, the last of such solutions being of about 20% strength. The hide is, of course, soaked in each of said solutions for a time. Thin skins are tanned through in a few days. The leather is yellowish brown and of good quality.

2. The skin is first tanned as in Example II.1 and then further treated with an acidified mixture of the products of Examples I.2 and I.3.

3. The skin is treated with a mixture of 100 parts of quebracho extract and 40 parts of soda salt of the product of Example I.2, beginning with a solution of 5 to 10% and finishing with 25% tanning substance.

*III. Example for the dissolving of difficultly soluble tanning substances by means of condensation products.*

100 parts of quebracho extract are mixed and heated with 40 parts of soda salt of the product of Example I.2 and 200 parts of water. The solution obtained may be further diluted; the insoluble quebracho ingredients are no longer precipitated.

The expression "aromatic sulfonic acid material" as used in some of the appended claims, is intended to cover the ready formed sulfonic acids as well as the materials from which these can be derived. Also the term "a non-oxidized sulfur-containing material" includes free sulfur as well as sulfids.

I claim:—

1. A condensation product of aromatic hydrocarbon, sulphuric acid and sulphur, such product having tanning properties.

2. A condensation product of an aromatic hydrocarbon, sulfuric acid and sulfur, which has tanning properties, which product will not be removed from the hide, by soaking in soda solution of a strength adapted to detan leather tanned with vegetable tanning agents.

3. A product comprising the reaction product of a polycyclic aromatic hydrocarbon, sulfuric acid and sulfur, such product being in part readily soluble in water and in part not readily soluble therein, the latter part upon treatment with an alkaline material becoming more readily soluble, both of such parts upon treatment with alkali becoming lighter in color, the solutions in both instances being capable of tanning hide and capable of increasing the solubility of difficultly soluble vegetable tanning materials, the readily soluble alkaline solutions remaining readily soluble upon acidification.

4. A process of forming a condensation product suitable for use as a tanning agent, which comprises heating an acid mixture containing an aromatic sulfonic acid material and a non-oxidized sulfur-containing material, and thereafter dissolving the product in an alkaline solution.

In testimony whereof I affix my signature.

FRANZ HASSLER.